United States Patent
Okumura

(10) Patent No.: US 6,556,843 B1
(45) Date of Patent: Apr. 29, 2003

(54) IC CARD AND COMMUNICATION SYSTEM USING IC CARD

(75) Inventor: Seiya Okumura, Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 124 days.

(21) Appl. No.: 09/703,660

(22) Filed: Nov. 2, 2000

(30) Foreign Application Priority Data

Feb. 7, 2000 (JP) ........................................ 2000-028726

(51) Int. Cl.$^7$ ................................................ H04B 1/38
(52) U.S. Cl. .................... 455/558; 455/557; 455/226.1; 379/93.05
(58) Field of Search ................................ 455/558, 575, 455/557, 226.1; 375/222, 220, 219; 379/93.05

(56) References Cited

U.S. PATENT DOCUMENTS

| | | | |
|---|---|---|---|
| 5,617,449 A | 4/1997 | Tanaka | |
| 5,628,055 A | 5/1997 | Stein | |
| 5,754,588 A | 5/1998 | Tanaka | |

FOREIGN PATENT DOCUMENTS

| | | | |
|---|---|---|---|
| DE | 195 32 069 A1 | 1/1997 | |
| GB | 2 285 558 A | 7/1995 | |
| JP | 7-234922 | 9/1995 | |

OTHER PUBLICATIONS

EP Search Report mailed May 31, 2002.

*Primary Examiner*—Edward F. Urban
*Assistant Examiner*—Sheila Smith
(74) *Attorney, Agent, or Firm*—Nixon & Vanderhye P.C.

(57) ABSTRACT

There are provided an IC card and a communication system, wherein the IC card is enabled to be connected with a different infrastructure. The communication system using the IC card comprises a PC (20) provided with an IC card-inlet slot, an IC card unit (10), and an external communication apparatus (30) connected with the IC card unit (10); wherein the card is provided therein with a radio portion (12) and a radio controlling portion (13) for performing data communication, an interface (18) to be connected with the external communication apparatus (30) for enabling data communication with infrastructure (2), a memory (17) for storing data of each infrastructure to be periodically renewed, and a card controlling portion (16) for selecting an infrastructure on the basis of data of the infrastructure stored in the memory (17) for executing data communication between the infrastructure thus selected and the PC (20).

7 Claims, 2 Drawing Sheets

IC CARD AND COMMUNICATION SYSTEM USING IC CARD

BACKGROUND OF THE INVENTION

The present invention relates to an IC card provided with a radio portion which makes it possible to communicate with an infrastructure and also to a communication system using such an IC, card. Particularly, the present invention relates to an IC card which makes it possible to communicate with a plurality of infrastructures (such as Infrastructure 1: PHS (Personal Handyphone System); and Infrastructure 2: PDC (Personal Digital Cellular) network) and to a communication system using such an IC card.

This IC card is formed of a conventional card into which an LSI chip is sealed and is constructed in various ways. For example, in the case of an IC card of radio modem, an IC card unit and one infrastructure-coordinating portion coordinating to one infrastructure-network are disposed so as to constitute a pair of components at the inside and outside of the card, respectively, as disclosed in Japanese Patent Laid-Open Publication H2-268390.

According to the device disclosed in Japanese Patent Laid-Open Publication H7-234922, a plurality of connectable infrastructure-coordinating portions are accommodated in a single modem body, thereby enabling an IC card unit to communicate with an optionally selected infrastructure-network.

However, according to these conventional radio-integrated cards, an interface component which is capable of connecting with an external apparatus for achieving the communication with a further different infrastructure is accommodated in the card. Namely, these conventional radio-integrated cards are not provided with means for performing automatic switching on the basis of information of infrastructure. Therefore, if it is desired to communicate with a different infrastructure, such a conventional card is required to be replaced by a different card which is capable of utilizing the aforementioned external apparatus, and then the call set-up (for example, a set-up for dial-up connection on Windows) from a personal computer (which may be referred to simply as PC) is required to be manually switched for the purpose of the communication.

Namely, since these conventional IC cards are not provided with an interface component which is capable of connecting with an external apparatus for achieving the communication with a further different infrastructure, these IC cards are incapable of executing a communication in a situation where it is impossible to detect information from an infrastructure with which the IC card can be directly communicated, e.g. a region where the condition for radio-communication is bad. Therefore, if it is desired to communicate with a different infrastructure, such a conventional card is required to be replaced by a different IC card which is capable of utilizing the aforementioned external apparatus. Furthermore, it is also required for a user to prepare in advance a number of IC cards each coordinating to each infrastructure, and to manually perform the switching of information which is peculiar to the infrastructure such as call set-up on a PC. Namely, these conventional IC cards are accompanied with a problem that the handling thereof is troublesome.

BRIEF SUMMARY OF THE INVENTION

The present invention has been made in view of overcoming the aforementioned problem. Therefore, it is an object of the present invention to provide an IC card which is capable of -being connected with a different infrastructure, capable of automatically selecting an infrastructure without necessitating for a user to alter the information from the infrastructure of PC, and capable of executing a smooth data communication without necessitating the exchange of IC card whenever a communication with a different infrastructure is to be executed or without necessitating the switching of the information of infrastructure from the PC.

Another object of the present invention is to provide a communication system using such an IC card.

The IC card according to the present invention is featured in that it comprises radiocommunication means for performing a radiocommunication with a first infrastructure; an interface adapted to be connected with an external communication apparatus for performing a radiocommunication with a second infrastructure which differs from said first infrastructure; memory means for storing data distinguishing said first infrastructure from said second infrastructure; and controlling means which is designed to select, in accordance with a command from a data processor, an infrastructure on the basis of the data on the infrastructures stored in said memory means and to perform a controlling in the execution of data communication between said data processor and an infrastructure which has been selected; and that said card is enabled to be connected with the external communication apparatus through said interface, and a communication of said card with said second infrastructure is enabled by making use of said external communication apparatus.

The aforementioned controlling means is constructed such that the memory means is enabled to store, as a data of the infrastructure, the data of the field strength to be periodically transmitted from each infrastructure, and based on this data of the infrastructure, the controlling means functions to control the radiocommunication means and the interface to be connected with an external communication apparatus, thereby enabling the IC card to be communicated not only with the first infrastructure by making use of the aforementioned radiocommunication means disposed inside the IC card, and but also with the second infrastructure by making use of an external communication apparatus and by way of the interface to be connected with the external communication apparatus.

The aforementioned controlling means is constructed also such that, when the data of infrastructure is not available from an infrastructure even if the transmission of data on the infrastructure is requested by the data processor, the communication is switched to another infrastructure. Namely, even if the request for transmission by the data processor is directed to the infrastructure from which no data can be obtained, the communication with infrastructure is automatically switched to another infrastructure which can be communicated with, thereby making it possible to perform the transmission.

Further, the aforementioned controlling means is also constructed such that, when a user has designated a communication with an infrastructure which is incapable of performing the communication, the communication is automatically switched to another infrastructure which can be communicated with, thereby making it possible to perform the transmission.

Further, the aforementioned controlling means is also constructed such that, when the connection between the interface to be connected with an external communication apparatus and the external communication apparatus is recognized from the data from the second infrastructure, the communication is automatically switched to a controlling system wherein the communication is to be executed using the aforementioned external communication apparatus, thereby making it possible to perform the transmission meeting the intention of a user.

Furthermore, the aforementioned controlling means is also constructed such that, once the communication has been switched to a controlling system wherein the communication is to be executed using the aforementioned external communication apparatus, the transmission to the second infrastructure is automatically executed even if a user has requested a communication with the first infrastructure, thereby making it possible to perform the transmission meeting the intention of a user without troubling the user to perform a troublesome operation.

The communication system using the IC card of the present invention comprises an IC card provided with radio-communication means for performing a radiocommunication with a first infrastructure; a data processor provided with an interface adapted to be connected with the IC card, thereby enabling the data processor to input a command of initiating the data communication as well as a command related to a designation of infrastructure to be employed to the IC card connected with the interface; and an external communication apparatus which is adapted to be connected with the IC card, thus enabling it to be communicated with a second infrastructure differing from the first infrastructure; wherein the IC card is selected from those claimed in claims.

DETAILED DESCRIPTION OF THE INVENTION

Next, preferable embodiments of the IC card and communication system using the IC card according to the present invention will be explained with reference to drawings.

Figure 1:
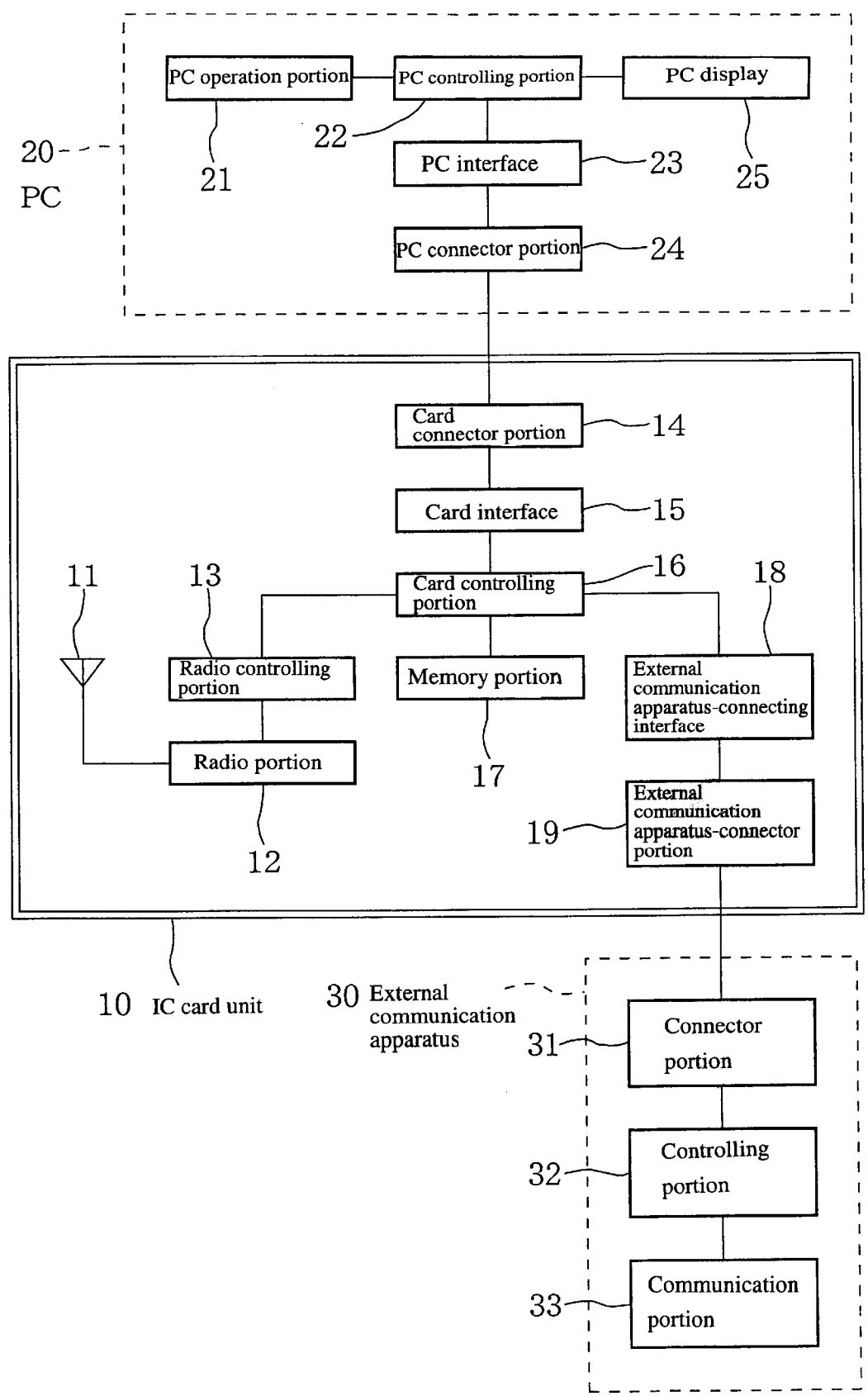
FIG. 1 is a block diagram illustrating a communication system wherein an IC card representing one embodiment of the present invention is employed.

FIG. 1 is a block diagram illustrating a communication system wherein an IC card representing one embodiment of the present invention is employed. According to the present embodiment, the IC card is applied to a radio portion-integrated card having a radio portion, while the data processor is applied to a personal computer.

Referring to FIG. 1, the reference number 10 represents an IC card unit, 20 a personal computer (PC) provided with an IC card-inlet slot (data processor), and 30 an external communication apparatus connected to the IC card unit 10. In this case, one end of the IC card unit 10 is accommodated in and connected with the PC 20, while the other end of the IC card unit 10 is connected with the external communication apparatus 30 constituting a second infrastructure coordinating portion. This external communication apparatus 30 is constructed as a communication portion so as to coordinate to various kinds of infra-network.

The PC 20 comprises a PC operation portion 21 constituted by a pointing device such as a key board and mouse for executing data input and various kinds of functional command; a PC controlling portion 22 including a PC interface for controlling the entire device; a PC interface 23 specified according to the PCMCIA (Personal Computer Memory Card Interface Association) standard; a PC connector portion 24 constituted by an inlet slot and a connector for allowing the PC 20 to be connected with the IC card unit 10; and a PC display 25 constituted by an LCD device, a driver, etc.

The external communication apparatus 30 comprises a connector portion 31 constituted by a connector and an interface for allowing the external communication apparatus 30 to be connected with the IC card unit 10; an external communication apparatus-controlling portion 32 constituted by a microcomputer, etc. for controlling the entire device; and a communication portion 33 enabling the communication with an infrastructure 2. This communication portion 33 makes it possible to execute a data communication with other data terminals by way of an infrastructure (the infrastructure 2) which differs from an infrastructure (an infrastructure 1) and to which the radio portion 12 of the IC card unit 10 coordinates, such as the PDC network, the CDMA (Code Division Multiple Access) network and the GPRS (Global System for Mobile Communications) network.

The IC card unit 10 comprises an antenna 11; a radio portion 12; a radio controlling portion 13; a card connector portion 14; a card interface 15; a card controlling portion (controlling means) 16 constituted by a microcomputer, etc.; a memory portion (memory means) 17 constituted by a EEPROM (electrically erasable programmable ROM) and designed to store therein communication data on an infrastructure to be connected therewith; an interface 18 for enabling the IC card unit 10 to be connected with an external communication apparatus; and an external communication apparatus-connector portion 19 such as a connector for executing the connection of IC card unit 10 with the external communication apparatus 30.

The antenna 11; the radio portion 12; the radio controlling portion 13; the card connector portion 14; the card interface 15; and the card controlling portion 16 constitute as a whole a radiocommunication means directed to the infrastructure 1, while the external communication apparatus-connecting interface 18 and the external communication apparatus-connector portion 19 constitute as a whole an external communication apparatus-connecting interface directed to the infrastructure 2 which differs from the infrastructure 1 as they are connected with the external communication apparatus 30.

The card connector portion 14 is formed of a connector which is accommodated inside the PC 20 so as to be connected, in the relationship of 1:1, with the PC 20. A request from the PC 20 is transmitted via the card connector portion 14 and the card interface 15 to the card controlling portion 16 so as to be entirely controlled by the card controlling portion 16. In this case, the expression of "request from the PC 20" means a request of the PC 20 for confirming if one or more infrastructures that have been connected via the IC card unit 10 are the infrastructures which are intended to be selected, so that a request is made by the IC card unit 10 to the infrastructure that has been selected for obtaining a data therefrom and the content of data thus obtained is verified.

The card controlling portion 16 functions to store the result thus confirmed of the connected infrastructure in the memory 17.

The radio portion 12 is constructed such that the signal from the radio controlling portion 13 is modulated and amplified so as to be transmitted from the antenna 11 to the infrastructure 1, and that the radio wave derived from the infrastructure 1 and received by the antenna 11 is selectively passed therethrough and then demodulated through the down-conversion thereof.

The radio controlling portion 13 is constructed such that through the controlling of radiocommunication of the radio portion 12, the radio portion 12 is permitted to communicate via a radio territory with the infrastructure 1. The result of communication (confirmed result) with the infrastructure 1 is periodically transmitted, together with the determination of whether or not the radio territory can be utilized, from the radio controlling portion 13 to the card controlling portion 16 and then stored in the memory portion 17 by way of the card controlling portion 16. The memory portion 17 is constructed so as to store therein the data of field strength that will be periodically transmitted, in the form of confirmed result on the infrastructure that has been connected therewith, from each infrastructure for example.

On the other hand, the card controlling portion 16 is also enabled, by way of the external communication apparatus-connecting interface 18, to perform a data communication utilizing the external communication apparatus 30. The data communication utilizing the external communication apparatus 30 is referred to as the infrastructure 2 in this specification.

As the external communication apparatus 30 is connected with the external communication apparatus-connector portion 19 by making use of the connector portion 31 accommodated in the external communication apparatus 30, the card controlling portion 16 is actuated to recognize the data of the infrastructure 2 that has been periodically transmitted from the external communication apparatus 30, and then, the data is stored in the memory portion 17.

As explained above, the IC card unit 10 is provided, inside the card thereof, with a radio portion 12 and a radio controlling portion 13 for performing data communication through the PC 20 with an infrastructure (infrastructure 1), with the external communication apparatus-connecting interface 18 which is capable of connecting with the external communication apparatus 30 for enabling data communication with a different infrastructure (infrastructure 2), with a memory 17 for storing data of each infrastructure to be periodically renewed, and with a card controlling portion 16 which is capable of entirely controlling the card unit including the aforementioned various components.

In the foregoing embodiment, a card accommodating communication means for enabling a communication with an infrastructure is referred to as an IC card in this specification. However, the terms of IC card is employed for the purpose of convenience in this specification so that the terms of IC card should be understood as including also a PC card (PCMCIA card) to be employed in a PC or various kinds of information machine.

Next, the operation of the IC card constructed as explained above and of the communication system using the IC card will be explained.

According to the communication system using this IC card, an infrastructure to be utilized is designated at first from the application installed in the PC 20 on the occasion of initiating a data communication, and at the same time, a command to initiate the data communication is input through the card connector portion 14 and the card interface 15.

Then, in the card controlling portion 16, each data on the infrastructure which is stored in the memory portion 17 is read out on the basis of the command from the PC 20, and the data thus read out is compared with the data designated as an actually usable infrastructure.

In this case, the card controlling portion 16 takes up the data on the infrastructure which includes information indicating that a radio territory can be periodically utilized, the infrastructure being stored in the memory portion 17. Further, in the card controlling portion 16, whether or not the radio territory can be utilized at present is verified on the basis of the information on the infrastructure. When it is determined that the radio territory can be utilized, a processing for executing a data communication is performed. When the radio territory of infrastructure based on the command from the PC 20 is found unusable, it is further verified whether or not the radio territory of another different infrastructure (herein the infrastructure 2) can be utilized. When it is determined that this radio territory can be utilized, a processing for executing a data communication is performed.

Therefore, without necessitating for a user to prepare a plurality of cards each coordinating to each infrastructure or to re-set the information which is peculiar to the infrastructure such as call set-up, the card controlling portion 16 can be automatically connected with the infrastructure of the external communication apparatus 30 even if the request for transmission is a communication by way of radio portion 12 accommodated inside the card, thereby making it possible to perform a smooth data communication.

Next, the operation of the communication system using the aforementioned IC card will be explained in detail with reference to the flow chart thereof.

Figure 2:
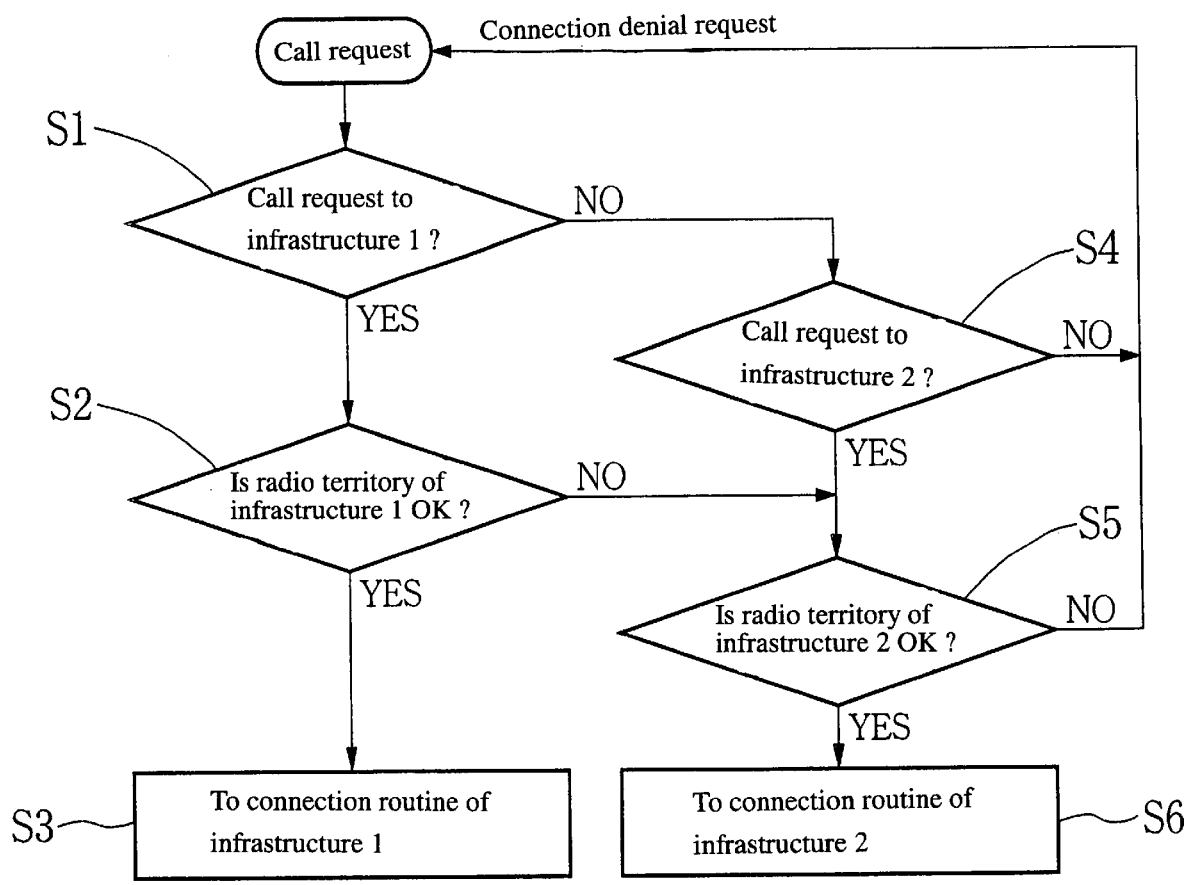
FIG. 2 is a flow chart illustrating the operation of confirming the infrastructure representing one embodiment of the present invention.

FIG. 2 is a flow chart illustrating the operation of confirming the infrastructure in the IC card unit 10, wherein the operation of the card controlling portion 16 constituted by a microcomputer, etc. is illustrated. In FIG. 2, S denotes each of the steps of the flow.

When this program is started in response to the call request, it is determined if the call request from the PC 20 is a request directed to the infrastructure 1 at the step S1. When it is confirmed that the request is directed to the infrastructure 1, it is further verified as to if the radio territory of the infrastructure 1 can be utilized at the step S2. When it is confirmed that the radio territory of the infrastructure 1 can be utilized, the process is shifted to a radio connection routine (not shown) of step S3 which is directed to the infrastructure 1, thereby finishing this flow and allowing a data communication through the execution of the radio connection, routine of the infrastructure 1. On the other hand, when it is impossible to utilize the radio territory of the infrastructure 1, the process is advanced to the step S5.

On the other hand, when it is not determined at the step S1 that the call request is directed to the infrastructure 1, it is further determined at the step S4 if the call request from the PC 20 is a request directed to the infrastructure 2. When it is confirmed that the request is directed to the infrastructure 2, the request is treated as a request for the infrastructure 2, and then, it is further verified at the step S5 as to if the radio territory of the infrastructure 2 can be utilized. When it is confirmed that the radio territory of the infrastructure 2 can be utilized, the process is shifted to a radio connection routine (not shown) of step S6 which is directed to the infrastructure 2, thereby finishing this flow and allowing a data communication using the external communication apparatus 30 through the execution of the radio connection routine of the infrastructure 2.

When it is determined at the step S4 that the call request is not directed to the infrastructure 2, or when it is determined at the step S5 that the radio territory of the infrastructure 2 cannot be utilized, the connection denial request is turned to the PC 20 since both infrastructure 1 and infrastructure 2 cannot be utilized.

When the operation of the card controlling portion 16 is confined to the aforementioned processes and incapable of performing the communication to the normal infrastructures, the card controlling portion 16 is automatically enabled to perform a data communication to quite a different infrastructure.

By executing the aforementioned flow, it becomes possible, even if a data from one of infrastructures is not available in spite of the request of transmission from the PC 20, to execute the transmission by giving a priority to the communication with the other infrastructure. Likewise, even if the request of transmission from the PC 20 is a request of the communication with an infrastructure from which data cannot be obtained, the communication can be automatically switched to the communication with an infrastructure with which the communication can be performed, thus making it possible to perform transmission.

Figure 3:
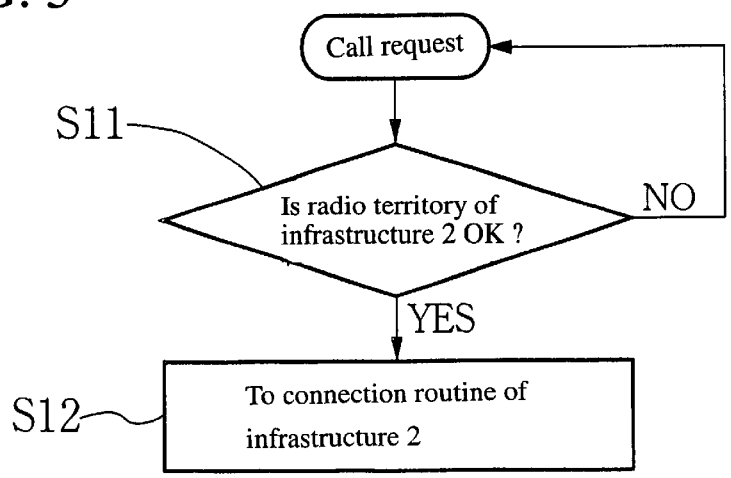
FIG. 3 is a flow chart illustrating the operation of confirming the infrastructure representing one embodiment of the present invention.

FIG. 3 is a flow chart illustrating the operation of confirming the infrastructure in the IC card unit 10, wherein the operation of the card controlling portion 16 is illustrated.

When this program is started in response to a call request, it is verified at the step S11 as to if the radio territory of the infrastructure 2 can be utilized. When it is confirmed that the radio territory of the infrastructure 2 can be utilized, the process is shifted to a radio connection routine of step S12 which is directed to the infrastructure 2, thereby finishing this flow and allowing a data communication using the external communication apparatus 30 through the execution of the radio connection routine of the infrastructure 2. On the other hand, when it is impossible to utilize the radio territory of the infrastructure 2, the connection denial request is turned to the PC 20 since the, infrastructure 2 cannot be utilized.

In the case of this flow, since the fact that the external communication apparatus 30 is connected with the communication system so that the radio territory of the infrastructure 2 can be utilized is acknowledged in advance by the card controlling portion 16, the call request from the PC 20 is all treated as a data communication directed to the infrastructure 2.

Further, in response to the call request, a judgment is performed at the step S11 as to if the radio territory can be utilized. Since the user of the external communication apparatus 30 desires a data communication by way of the external communication apparatus 30, it is assumed that the IC card unit 10 is connected with the external communication apparatus 30. Therefore, once the data on the infrastructure is recognized through the external communication apparatus 30, the controlling is performed in such a way that the data communication automatically becomes one where the external communication apparatus 30 is utilized.

Namely, since the data on infrastructure which will be fed from the external communication apparatus-connecting interface 18 which can be connected with the external communication apparatus 30 are those which can be derived by making use of the external communication apparatus 30 as desired by a user, the data will be preferentially treated, so that even if the request of transmission is a communication by way of the radio portion 12 accommodated inside the card, the card controlling portion 16 is automatically connected with an infrastructure of the external communication apparatus 30.

As explained above, the communication system using the IC card according to this embodiment comprises a PC 20 provided with an IC card-inlet slot, an IC card unit 10, and an external communication apparatus 30 connected with the IC card unit 10 and coordinated to the infrastructure 2; wherein the card is provided therein with a radio portion 12 and a radio controlling portion 13 for performing data communication between the infrastructure 1 and the PC 20, with the external communication apparatus-connecting interface 18 to be connected with the external communication apparatus 30 for enabling data communication with infrastructure 2, with the memory portion 17 for storing data of each infrastructure to be periodically renewed, and with the card controlling portion 16 for selecting an infrastructure on the basis of data of the infrastructure stored in the memory 17 and in accordance with the instruction from the PC 20 for executing data communication between the infrastructure thus selected and the PC 20.

The card controlling portion 16 functions such that the data of field strength to be periodically transmitted from each infrastructure is stored in the memory portion 17. When it is impossible to obtain a data from an infrastructure in spite of a transmission request by the PC 20, it is controlled so as to switch it to the communication with another infrastructure. Therefore, it is possible to connect the system with a different infrastructure by way of the external communication apparatus-connecting interface 18, so that the infrastructure can be automatically selected without necessitating for a user to modify the data from the infrastructure of the PC 20.

As a result, without necessitating the preparation of cards for each infrastructure, without necessitating the exchange of card for each communication, and without necessitating the switching of data of infrastructure from the PC 20, it is possible to execute a smooth data communication.

In the aforementioned embodiment, the data processor is applied to the PC. However, the data processor can be applied to any kinds of device as long as it is an information communication apparatus. For example, the data processor can be applied to the PDA (Personal Digital Assistant). Further, the infrastructure may not be limited to that can be employed in a radio communication but may be that can be employed in a wired communication. Furthermore, the connection is not limited to the calling connection.

While the foregoing embodiment of the present invention has been explained in details for the purpose of illustration, it will be understood that the scope of the invention is not limited to the above embodiment. For example, according to the aforementioned embodiment, although the card controlling portion 16 is disposed separately from the radio controlling portion 13 controlling the radio portion 12, the card controlling portion 16 may be integrated together with the radio controlling portion 13 into one controlling portion.

In the aforementioned embodiment, a communication system employing a PC card of PC is explained. However, it may be a card of any system or specification as long as the device is of a type where an IC card is employed.

As explained above, according to the present invention, it is possible to connect the communication system with a different infrastructure, and to automatically select an infrastructure without necessitating for a user to alter the information from the infrastructure of PC. As a result, it is possible to execute a smooth data communication without necessitating the exchange of IC card for each communication or without necessitating the switching of the data of infrastructure from the PC.

What is claimed is:

1. An IC card comprising:

radiocommunication means for performing radiocommunication with a first infrastructure;

an interface to be connected with an external communication apparatus for performing radiocommunication with a second infrastructure which differs from said first infrastructure;

memory means for storing data distinguishing said first infrastructure from said second infrastructure;

controlling means for selecting, in accordance with a command from a data processor, one of the first and second infrastructures based at least upon the data distinguishing the infrastructures stored in said memory means, and for controlling communication between said data processor and the infrastructure which has been selected;

wherein said IC card to be connected with the external communication apparatus through said interface, and communication between said IC card and said second infrastructure is carried out via said external communication apparatus; and means for, when said first infrastructure has been requested in the command but data cannot be received from the requested first infrastructure, switching to communication with the second infrastructure even though the first infrastructure and not the second infrastructure had been requested in the command.

2. The IC card according to claim 1, wherein said controlling means is constructed such that the memory means is enabled to store, as a data of the infrastructure, the data of field strength periodically transmitted from each infrastructure; and based on the data of the infrastructure, the controlling means functions to control the radiocommunication means and the interface to be connected with an external communication apparatus.

3. The IC card according to claim 1, wherein said controlling means is constructed such that when a user designates a communication with an infrastructure which is incapable of performing the communication, the communication is automatically switched to another infrastructure which can be communicated with.

4. The IC card according to claim 1, wherein said controlling means is constructed such that when the connection between the interface to be connected with an external communication apparatus and the external communication apparatus is recognized from the data from the second infrastructure, the communication is automatically switched to a controlling system wherein the communication is to be executed using said external communication apparatus.

5. The IC card according to claim 4, wherein said controlling means is constructed such that once the communication has been switched to a controlling system wherein the communication is to be executed using said external communication apparatus, the transmission to the second infrastructure is automatically executed.

6. A communication system comprising;

an IC card provided with radiocommunication means for performing a radiocommunication with a first infrastructure;

a data processor provided with an interface adapted to be connected with the IC card, thereby enabling the data processor to input a command of initiating the data communication as well as a command related to a designation of infrastructure to be employed to the IC card connected with the interface; and an external communication apparatus which is adapted to be connected with the IC card, thus enabling it to be communicated with a second infrastructure differing from the first infrastructure;

wherein the IC card is that of claim 1.

7. An IC card comprising:

an antenna and radio controller for communicating with a first infrastructure;

an interface to be connected with an external communication apparatus, the external communication apparatus for communicating with a second infrastructure which differs from said first infrastructure;

a memory for storing data distinguishing said first infrastructure from said second infrastructure;

wherein the data in the memory distinguishing the infrastructure from one another enables one of the infrastructures to be selected in accordance with a received command that includes an infrastructure request; and a controller for, when said first infrastructure has been requested in the command but data cannot be received therefrom, switching to communication with the second infrastructure even though the first infrastructure and not the second infrastructure had been requested in the command.

* * * * *